United States Patent
Raubuch

(10) Patent No.: US 7,809,931 B2
(45) Date of Patent: Oct. 5, 2010

(54) ARRANGEMENT, SYSTEM AND METHOD FOR VECTOR PERMUTATION IN SINGLE-INSTRUCTION MULTIPLE-DATA MIRCOPROCESSORS

(75) Inventor: Martin Raubuch, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 276 days.

(21) Appl. No.: 10/531,756

(22) PCT Filed: Oct. 6, 2003

(86) PCT No.: PCT/EP03/11176

§ 371 (c)(1),
(2), (4) Date: Apr. 14, 2005

(87) PCT Pub. No.: WO2004/038598

PCT Pub. Date: May 6, 2004

(65) Prior Publication Data

US 2006/0015705 A1    Jan. 19, 2006

(30) Foreign Application Priority Data

Oct. 23, 2002    (GB) .................................. 0224627

(51) Int. Cl.
*G06F 15/76*  (2006.01)
*G06F 9/00*   (2006.01)
*G06F 7/38*   (2006.01)

(52) U.S. Cl. ................ 712/221; 712/2; 712/4; 712/7

(58) Field of Classification Search .............. 712/1–248
See application file for complete search history.

(56) References Cited

U.S. PATENT DOCUMENTS 4,825,361 A * 4/1989 Omoda et al. .................. 712/6
4,935,891 A * 6/1990 Curry .......................... 708/276

(Continued)

FOREIGN PATENT DOCUMENTS

GB    2394571 A    4/2004

(Continued)

OTHER PUBLICATIONS

Bhandarkar et al, "Vector extensions to the VAX architecture"—Computer Society International Conference (COMPCON), Feb. 26-Mar. 2, 1990, Los Alamitos, IEEE Comp. Soc. Press, USA.

(Continued)

*Primary Examiner*—Eddie P Chan
*Assistant Examiner*—William B Partridge

(57) ABSTRACT

A vector permutation system (100) for a single-instruction multiple-data microprocessor has a set of vector registers (110) which feed vectors to permutation logic (120) and then to a negate block (130) where they are permuted and selectively negated according to control parameters received from a selected one of a set of control registers (140). A control arrangement (145, 150) selects which control register is to provide the control parameters. In this way no separate permutation instructions are necessary or need to be executed, and no permutation parameters need to be stored in the vector registers (10). This leads to higher performance, a smaller vector registers file and hence a smaller size of the microprocessor and better program code density.

25 Claims, 2 Drawing Sheets

U.S. PATENT DOCUMENTS

| | | | |
|---|---|---|---|
| 5,758,176 A * | 5/1998 | Agarwal et al. | 712/23 |
| 5,996,057 A * | 11/1999 | Scales et al. | 712/5 |
| 6,223,320 B1 | 4/2001 | Dubey et al. | |
| 6,334,176 B1 | 12/2001 | Scales, III et al. | |
| 6,886,124 B2 * | 4/2005 | Wang | 714/738 |

FOREIGN PATENT DOCUMENTS

| | | |
|---|---|---|
| JP | 61-269775 | 11/1986 |
| JP | 06-250751 | 9/1994 |
| KR | 10-2005-0048465 A | 5/2005 |
| WO | 2004038598 A1 | 10/2003 |

OTHER PUBLICATIONS

Paver, N., Special Focus: Intel WMX: Intel XScale Microarchitecture with Wireless MMX Technology, www.intel.com/pca/developernetwork.com, vol. 4, Summer 2002, pp. 6-10.

* cited by examiner

ARRANGEMENT, SYSTEM AND METHOD FOR VECTOR PERMUTATION IN SINGLE-INSTRUCTION MULTIPLE-DATA MIRCOPROCESSORS

FIELD OF THE INVENTION

This invention relates to microprocessors with Single-Instruction Multiple-Data (SIMD) capability.

BACKGROUND OF THE INVENTION

In the field of this invention microprocessors with SIMD architecture are arranged to process vector operands. It is known to provide instructions that permute (rearrange the order of) the components of vector operands in order to improve the efficiency of digital signal processing algorithms on SIMD microprocessors. Permutation parameters are required to determine the characteristics of the permutation to be performed.

However, this approach has the disadvantage(s) that if the vector permutation requires extra instructions, performance decreases. If the permutation parameters and/or the permuted vector operand require extra registers in the microprocessor's vector register file, a large register file is required. This increases the microprocessor's size and has a negative impact on program code density.

A need therefore exists for an arrangement, system and method for vector permutation in SIMD microprocessors wherein the abovementioned disadvantage(s) may be alleviated.

SUMMARY

In accordance with a first aspect of the invention there is provided an arrangement for vector permutation in SIMD microprocessors as claimed in claim 1.

In accordance with a first aspect of the invention there is provided a system for vector permutation in SIMD microprocessors as claimed in claim 2.

In accordance with a third aspect of the invention there is provided a method for vector permutation in SIMD microprocessors as claimed in claim 5.

The arrangement preferably further includes a negate block coupled to the control means and coupled to receive and selectively negate vectors from the permutation logic block according to the control parameters received from the control means, wherein the control parameters include permutation parameters and negate parameters.

Preferably the control means includes at least one counter arranged to provide a sequential order for selecting one of the plurality of control registers.

The control register parameters are preferably also used for determining negate characteristics and the step of permutating further includes the step of selectively negating the vectors according to the parameters of the selected control register. Preferably the step of selecting further includes the following of a sequential order of the plurality of control registers.

Preferably the sequential order includes automatic sequencing through a set of fixed control parameters. Alternatively the sequential order preferably includes automatic sequencing through a set of programmable control parameters. The sequential order is preferably cyclical.

In this way an arrangement, system and method for vector permutation in SIMD microprocessors is provided in which no separate permutation instructions are necessary or need to be executed, and no permutation parameters need be stored in the vector registers. This leads to higher performance, a smaller vector register file and hence a smaller size of the microprocessor and better program code density.

BRIEF DESCRIPTION OF THE DRAWINGS

One arrangement, system and method for vector permutation in SIMD microprocessors incorporating the present invention will now be described, by way of example only, with reference to the accompanying drawings, in which.

DESCRIPTION OF PREFERRED EMBODIMENT(S)

Within the field of SIMD architecture, it is known that permutation and optional negate operations of vector operands may be performed as side operations of certain instructions and do not themselves require separate instructions or execution cycles.

However, programmers need control over when and how such permutations are performed. In order to control when permutations are performed, qualifiers are needed. These qualifiers may be:
enable/disable mechanisms
vector register numbers
instruction types
other In order to control how permutations are performed, permutation parameters, source/destination operands or optional negate operations are needed. Such permutation parameters can either be fixed (hard-wired for specific algorithms) or programmable (stored in registers).

Figure 1:
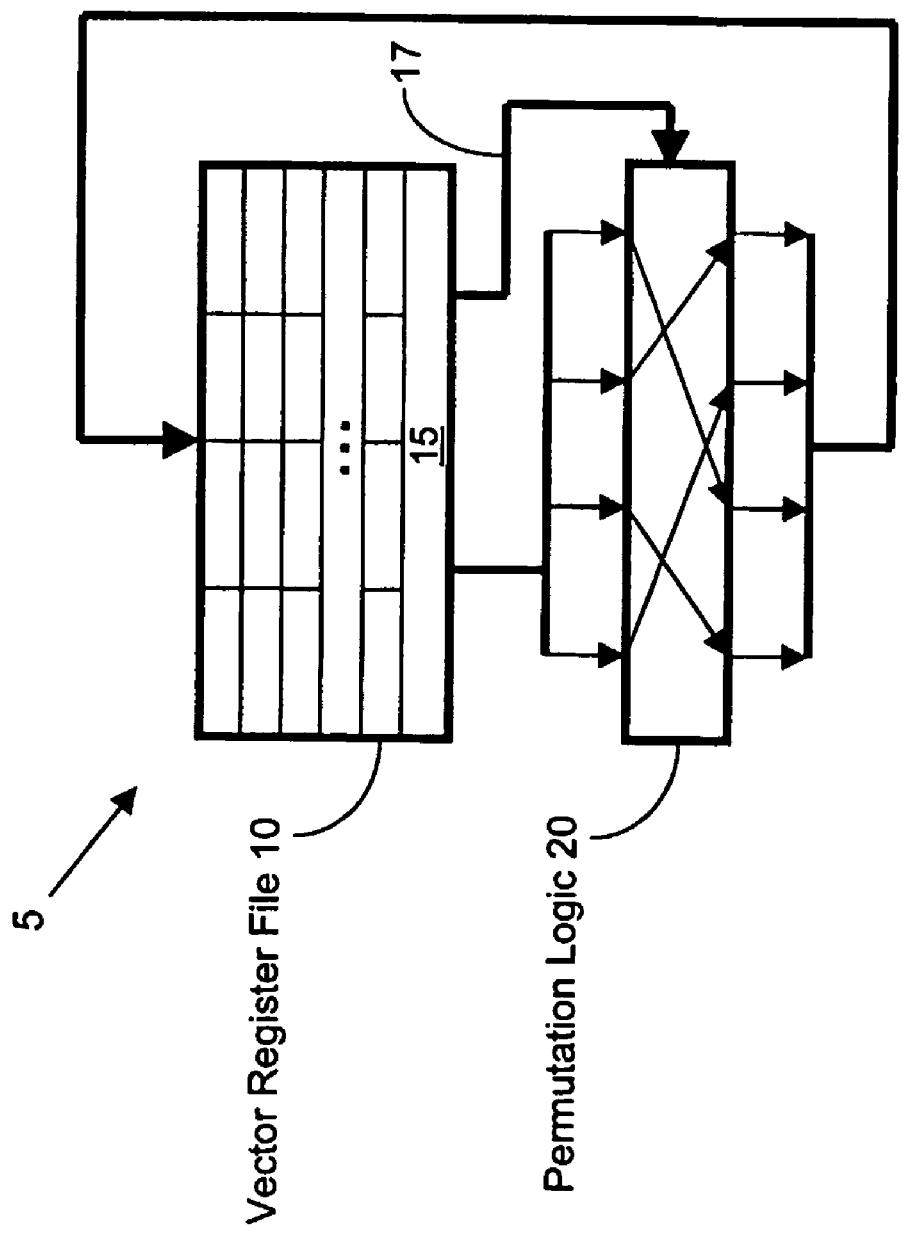
FIG. 1 shows a block schematic diagram of a known microprocessor with SIMD architecture.

Referring now to FIG. 1, there is shown a prior art microprocessor 5 with SIMD architecture. A vector register file 10 of the microprocessor feeds vector operands into a permutation logic block 20. The vector register file 10 has a predetermined number of registers. The number of general purpose and/or vector registers in modern Reduced Instruction Set Chip (RISC) machines typically is an integer to the power of 2 with 8/16/32/64 being the most common numbers. In the example depicted in FIG. 1, there are 32 128-bit registers, each register having four 32-bit elements. The last register (register 15) is used to store control parameters for controlling the permutation logic block 20, as depicted by arrow 17.

Figure 2:
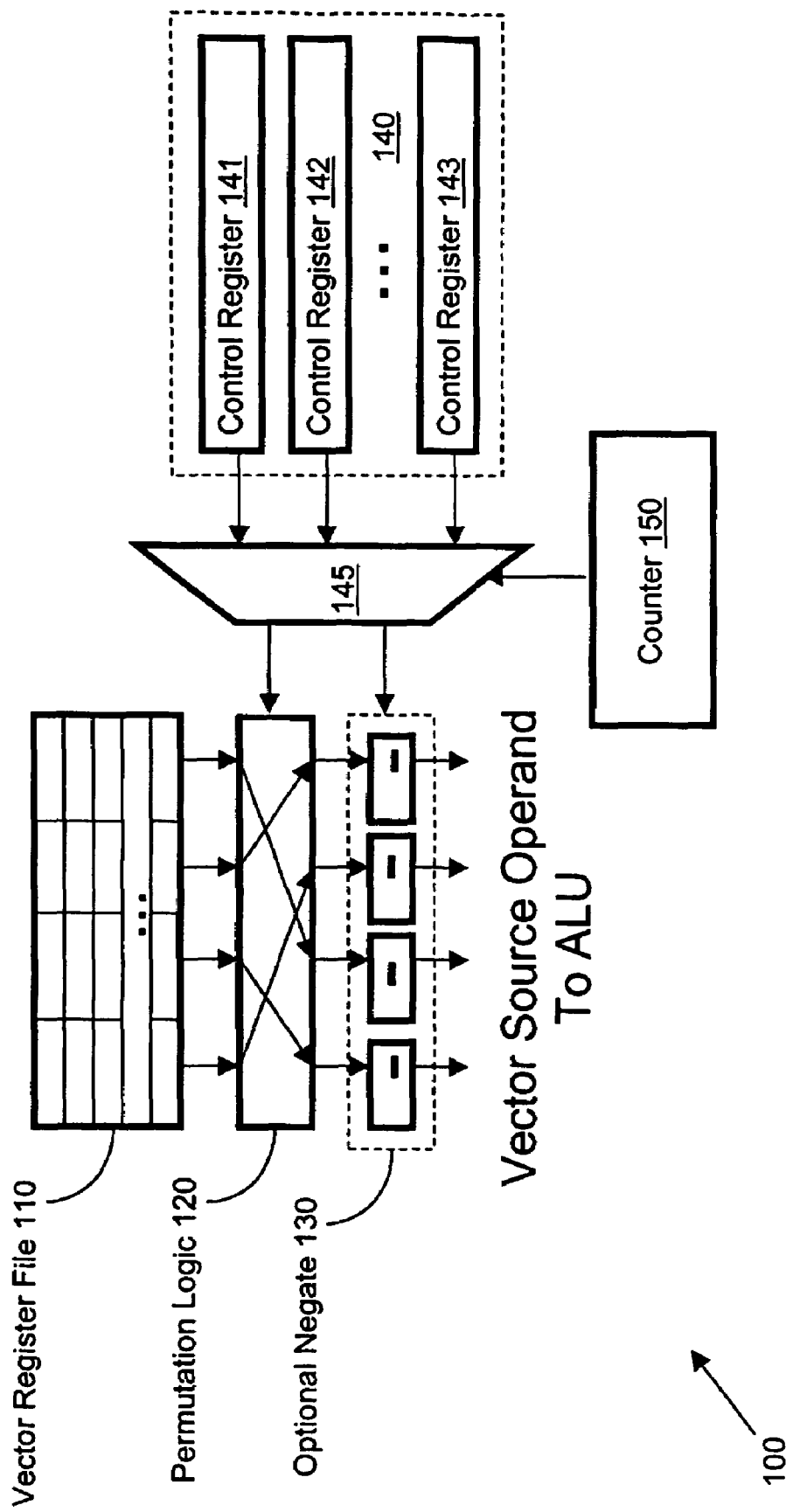
FIG. 2 shows a block schematic diagram of a microprocessor system with SIMD architecture incorporating the present invention.

Referring now to FIG. 2, there is shown a microprocessor 100 with SIMD architecture. A read port of a vector register file 110 feeds vector operands into a permutation logic block 120 and from there into a negate logic block 130. The vector register file 110 has a predetermined number of registers. In the example depicted in FIG. 2, there are 8 128-bit registers (of which 5 are shown), each register having four 32-bit elements.

The output is typically used as source operand for a vector Arithmetic Logic Unit (ALU) (not shown).

Permutation and negate parameters relating to permutations to be performed upon the vectors of the vector register file 110 are stored as control parameters in a series of control registers 140. A control block 145 is coupled to each of the series of control registers 140 and is further coupled to provide the control parameters therefrom to control the permutation logic block 120 and the optional negate logic block 130. A counter 150 is also coupled to the control block 145, the counter 150 being arranged to determine which of the series of control registers is coupled via the control block 145 to the permutation logic block 120 and the optional negate logic block 130 at any one time.

In operation, the microprocessor 100 will commence with the counter 150 pointing at a given control register of the series 140, such as a first control register 141.

When a permutation is to be performed (all qualifiers true), the control parameters (permutation and negate parameters) stored in the first control register 141 are provided via the control block 145 to the permutation logic block 120 and to the optional negate logic block 130. The contents of the vector register file 110 are then processed by the permutation logic block 120 and the optional negate logic block 130 according to these control parameters. It will be noted that the optional negate logic block 130, being optional, may or may not perform a negate function on the contents of the vector register file 110, depending upon the received control parameters.

Once processed, the output vector source operand is sent to the ALU (not shown) and the counter 150 is incremented. This causes the control block 145 to select the next control register of the series 140 (such as the second control register 142) for the next permutation. The counter 150 is arranged to cycle through each of the series of control registers 140 in a repeating manner.

It will be understood that the an arrangement, system and method for vector permutation in SIMD microprocessors described above provides the following advantages: No extra instructions are required to permute/negate the components of vector operands, leading to higher performance. Furthermore, no further registers of the vector register file are required to store the permuted/negated vector operands and the permutation parameters. It should be noted that even with programmable permutation parameters, the control registers 140 of FIG. 2 are significantly smaller than the vector register 15 of FIG. 1. Since the microprocessor's register file is smaller, this leads to a smaller size of the microprocessor and better program code density (fewer bits in op-codes for vector register addressing).

It will be appreciated by a person skilled in the art that alternative embodiments to that described above are possible. For example, the control register series 140 and counter 150 may be augmented by multiple counters and control register series, coupled with qualifiers such as instruction type or register number. Also the counting sequence need not repeat in a cyclical fashion, and it is possible to load the counter(s) with specific sequence start points by adding just one further instruction. All of these features may be used to add complexity to the sequence of permutations and so further increase the flexibility of the architecture.

Furthermore the number and size of vector registers may differ from those described above, it being understood that the number of vector registers required by the present invention will be less than that required for an equivalent prior art arrangement.

The invention claimed is:

1. An arrangement for vector permutation in a single-instruction multiple-data microprocessor, the arrangement comprising:
    a vector register file;
    a permutation logic block coupled to receive and permutate vectors from at least one vector register of the vector register file according to control parameters, the permutation of the vectors being a side operation of an instruction;
    a plurality of control registers separate from the vector register file, each of the plurality of control registers being coupled to selectively provide control parameters to the permutation logic block; and
    a controller coupled between the plurality of control registers and the permutation logic block and arranged for selecting by an order one of the plurality of control registers and for providing the control parameters from the selected one of the plurality of control registers to the permutation logic block.

2. A single-instruction multiple-data microprocessor vector permutation system comprising:
    at least one vector register;
    a vector register file;
    a permutation logic block coupled to receive and permutate vectors from the at least one vector register of the vector register file according to control parameters, the permutation of the vectors being a side operation of an instruction;
    a plurality of control registers separate from the vector register file, each of the plurality of control registers being coupled to selectively provide control parameters to the permutation logic block; and
    a controller coupled between the plurality of control registers and the permutation logic block and arranged for selecting by an order one of the plurality of control registers and for providing the control parameters from the selected one of the plurality of control registers to the permutation logic block.

3. The arrangement of claim 1 further comprising a negate block coupled to the controller and coupled to receive and selectively negate vectors from the permutation logic block according to the control parameters received from the controller, wherein the control parameters include permutation parameters and negate parameters.

4. The arrangement of claim 1 wherein the controller control means includes at least one counter arranged to provide the order as a sequential order for selecting one of the plurality of control registers.

5. A method for vector permutation in a single-instruction multiple-data microprocessor, the method comprising the steps of:
    providing vectors to be permutated in a vector register file;
    providing a plurality of control registers separate from the vector register file;
    providing a controller coupled between the plurality of control registers and the permutation logic block;
    selecting by an order one of a plurality of control registers, each control register containing parameters for determining permutation characteristics; and
    permutating the vectors as a side operation of an instruction according to the parameters of the selected control register.

6. The method of claim 5 wherein the control register parameters are also used for determining negate characteristics and the step of permutating further includes the step of selectively negating the vectors according to the parameters of the selected control register.

7. The method of claim 5 wherein the step of selecting by an order further includes the following of a sequential order of the plurality of control registers.

8. The arrangement of claim 4, wherein the sequential order includes automatic sequencing through a set of fixed control parameters.

9. The arrangement of claim 4, wherein the sequential order includes automatic sequencing through a set of programmable control parameters.

10. The arrangement of claim 4, wherein the sequential order is cyclical.

11. The system of claim 2 further comprising a negate block coupled to the controller and coupled to receive and selectively negate vectors from the permutation logic block according to the control parameters received from the controller, wherein the control parameters include permutation parameters and negate parameters.

12. The system of claim 2 wherein the controller means includes at least one counter arranged to provide the order as a sequential order for selecting one of the plurality of control registers.

13. The system of claim 12 wherein the sequential order includes automatic sequencing through a set of fixed control parameters.

14. The system of claim 12 wherein the sequential order includes automatic sequencing through a set of programmable control parameters.

15. The system of claim 12 wherein the sequential order is cyclical.

16. The method of claim 7, wherein the sequential order includes automatic sequencing through a set of fixed control parameters.

17. The method of claim 7 wherein the sequential order includes automatic sequencing through a set of programmable control parameters.

18. The method of claim 7 wherein the sequential order is cyclical.

19. The system of claim 1 wherein the plurality of control registers is external to the vector register file.

20. The system of claim 1 wherein the vector register file is free of the plurality of control registers.

21. The system of claim 2 wherein the plurality of control registers is external to the vector register file.

22. The system of claim 2 wherein the vector register file is free of the plurality of control registers.

23. The method of claim 5 wherein the plurality of control registers is provided external to the vector register file.

24. The method of claim 5 wherein the vector register file is provided free of the plurality of control registers.

25. An arrangement for vector permutation in a single-instruction multiple-data microprocessor, the arrangement comprising:
   a vector register file;
   a permutation logic block coupled to receive and permutate vectors from at least one vector register of the vector register file according to control parameters, the permutation of the vectors being a side operation of an instruction;
   a plurality of control registers separate from the vector register file, each of the plurality of control registers being coupled to selectively provide control parameters to the permutation logic block; and
   a controller coupled between the plurality of control registers and the permutation logic block and arranged for selecting by an order one of the plurality of control registers and for providing the control parameters from the selected one of the plurality of control registers to the permutation logic block wherein the controller includes at least one counter arranged to provide the order as a sequential order for cyclically sequencing through the plurality of control registers.

* * * * *

UNITED STATES PATENT AND TRADEMARK OFFICE
CERTIFICATE OF CORRECTION

| | | |
|---|---|---|
| PATENT NO. | : 7,809,931 B2 | Page 1 of 1 |
| APPLICATION NO. | : 10/531756 | |
| DATED | : October 5, 2010 | |
| INVENTOR(S) | : Martin Raubuch | |

It is certified that error appears in the above-identified patent and that said Letters Patent is hereby corrected as shown below:

Column 4, Lines 36 & 37, please change "the controller control means includes" to --the controller includes--

Column 5, Line 9, please remove "means"

Signed and Sealed this
Eleventh Day of October, 2011

David J. Kappos
*Director of the United States Patent and Trademark Office*